United States Patent Office 3,809,599
Patented May 7, 1974

3,809,599
METHOD FOR FORMING GLASS-CERAMIC
ARTICLES
Yu K. Pei, Toledo, Ohio, assignor to Owens-Illinois, Inc.
Continuation-in-part of abandoned application Ser. No. 149,650, June 3, 1971. This application June 28, 1972, Ser. No. 267,006
Int. Cl. B44f 1/00; C03b 9/14, 29/00
U.S. Cl. 161—1
18 Claims

ABSTRACT OF THE DISCLOSURE

A method for making a one-piece, cored glass article of substantial mass and having a complex configuration, by forming a glass-ceramic making material in molten state in a four-part mold having opposed members in pairs juxtapositioned and cooperating collectively to form a cored molding cavity. The closed and clamped mold includes an upper loading opening into which a pressing plunger is manipulated for pressing the material. The said material is of about 3 poise viscosity or less as it is loaded into the mold. The molten glass is pressed in the cored mold to fill the complex cavity and define the configuration of the article. Thereafter, during cooling the glass, the pressure on the glass is reduced by sequentially withdrawing the plunger and one or more of the mold faces and core sections to compensate for the difference in coefficient of expansion in the heat exchange between the contracting glass (undergoing cooling) and the expanding mold (undergoing heating). The faces of the opposed mold members are backed off from the hardening glass progressively. The formed glass liner article is cooled so as to prevent cracking, removed from the mold and inspected. Surplus inner and exterior segments of the article are then finished by drilling, cutting and grinding. The "green glass" article, partially mechanically finished, is then converted to a glass-ceramic material by heat treatment, and then given final finishing.

In the apparatus, a massive metal bed supports two pairs of opposed mold faces, comprised of a pair of end mold members and a pair of side mold members. The end mold members are movable longitudinally along the bed toward and away from each other and the side mold members are movable laterally of the bed toward and away from each other. The side mold members are pivotably mounted for juxtaposed positioning on the bed; the end molds are movable longitudinally along a track in the bed bottom for juxtaposed positioning cooperating with the side mold members to define a cored mold cavity for forming a one-piece article of glass. A pair of hand cranks and turn screws, mounted on each end of the bed, propels the end mold members on the bed. A closure member positioned about the top of the end members defines the loading aperture for the mold and locks the closed mold members in molding or forming position during the pressing operation.

This application is a continuation-in-part of my earlier copending application Ser. No. 149,650, filed June 3, 1971, now abandoned.

This invention relates to a method for molding a cored glass article of complex configuration from a highly fluid glass composition. The method further includes annealing and finishing steps performed on the molded article. The preferred form of the invention includes the manufacture of a glass-ceramic gas turbine inner liner article in which the molded and annealed piece is subsequently heat treated to transform the glass material to a glass-ceramic.

DESCRIPTION OF THE PRIOR ART

Glass-ceramic articles have uses in high temperature environments in that they are refractory, stable, rigid and provide very desirable low expansion characteristics. A gas turbine is an apparatus for imparting a rotating motion to a shaft by circulating and expanding very hot gases through a plurality of turbine blades attached to the shaft. The inner container for the hot gases (on the order of 2,000° F.) is called an "inner liner." Such hot environment at the inner liner heretofore has required the use of special alloy metals which are costly, and these alloy metals possess positive expansion characteristics in this degree of heat.

More recently, the gas turbine inner liner has been, experimentally at least, constructed of a zero or negative expansion material having refractory characteristics, this material being a glass-ceramic of relatively low cost, such as disclosed more specifically hereinafter. Although the material proposed, e.g. a glass-ceramic, is basically a low cost material, the manner of forming this material into a massive, complex one-piece casting, as an inner liner, is a problem specifically dealt with by the present invention. Slip casting is a probable manner by which this complex article may be molded and has heretofore been utilized; however, this invention proposes a more economical, a novel and more reliable method for producing the desired product of the glass-ceramic material.

SUMMARY OF THE INVENTION

This invention is a method for forming glass articles of the foregoing character in one piece, and provides a method to form such articles in a continuous producting line operation. Additional advantages provided by this invention are: the formed article is clear, permitting the detection of flaws in the glass prior to the additional expensive steps of annealing and conversion to a glass-ceramic material, resulting in cost savings.

This invention is a method for forming an article such as a gas turbine inner liner from a glass which is solidified to a "green glass" and then converted into a glass-ceramic material. The molten glass is placed in a special forming mold and partially fills the confines of the complex cavity by gravity flow. Next, a pressing plunger completely forms the glass in the cavity and the plunger is withdrawn. As the molten glass thereafter hardens to the configuration of the special mold, the special mold is opened by slightly withdrawing the mold members away from each other to compensate for the differences in the coefficient of thermal expansion between the glass and the metal mold. The differences of expansion occurs in the glass which is setting and contracting and the mold, which is being heated by the glass and expanding. It is an object of this invention to provide a process for forming, as one piece, a glass article such as the gas turbine inner liner, from a molten glass material loaded to a mold at or near 2,900° F. and pressing the article therein as one piece, while compensating for the differences in coefficients of thermal expansion between glass and mold without defects in the formed article. The latter is subsequently converted from a glass ("green glass" state) to a glass-ceramic state.

This invention enables forming a complex article such as a gas turbine inner liner from a glass-ceramic forming material. The process of this invention produces a superior article in that it obviates the need for forming several component parts to be subsequently joined mechanically into an inner liner. Rather, the present invention forms a one-piece cast glass article that is rough cored and later inspected, rough machined prior to heat treatment to convert the glass—green glass—into a glass-ceramic material of improved refractory and expansion properties. The glass-ceramic piece may then be finished by grinding and/or polishing.

BRIEF DESCRIPTION OF THE DRAWINGS

FIGS. 14–17, inclusive, schematically illustrate the molding steps of the invention in which:

FIG. 14 shows the mold in closed position ready for loading;

FIG. 15 shows the mold loaded with a quantity of molten glass;

FIG. 16 shows the pressing of the glass by force of the plunger; and

FIG. 17 shows the glass formed in the mold just after the pressing plunger is withdrawn.

FIGS. 18–21, inclusive, schematically illustrate the finishing steps of the invention in which:

FIG. 18 shows the molded glass article after removal from the mold and illustrates the step of drilling a central cylindrical passageway through the inner liner piece;

FIG. 19 shows the step of trimming the upper end of the inner liner piece by removal of a portion of the glass, such as by sawing;

FIG. 20 shows the inner liner piece after trimming and finished except for internal polishing or grinding; and FIG. 21 shows the inner liner piece undergoing machining, such as by grinding, one or more of the interior surfaces of the article.

DESCRIPTION OF THE INVENTION

In prior art practices, gas turbine inner liners were formed from a number of separate individual parts, using a slip casting technique, and the formed parts were brought together and joined by mechanical means, such as a frame, to form an inner liner. This invention provides a method for forming articles such as a hollow turbine inner liner by loading molten glass at about 2,900° F. and glass viscosity of about log 3 or less, transferring the molten glass into the mold of this invention, applying pressure to the molten glass to distribute it about the cored configuration of the mold cavity, compensating for the differences in coefficients of thermal expansion of the molten glass and the hot mold parts, permitting the molten glass to harden, removing the formed liner article of solidified green glass and annealing such glass article by prescribed schedule (hereinafter disclosed) to relieve stresses and avoid cracking of the piece. Next, the piece is partially finished by machining certain areas to the shape of the final inner liner. The partially machined, annealed glass is then converted to a glass-ceramic material by the additional heat treatment process steps described herein, and then finished by machining to the desired dimensions.

A turbine is an engine for imparting a rotating motion to a shaft by conducting expanding hot combustion gases through a plurality of blades attached to a rotatable power shaft. The turbine liner contains the hot gases; hence it operates in extremely hot temperature zones which require special alloy metals, ceramics or glass-ceramic materials to contain the expanding of hot gases.

This invention relates to an improved method of forming and finishing glass articles and converting same to a glass-ceramic which can contain the hot gases. The process or method provides for making the one-piece articles such as described herein, repetitively in production. Additional advantages provided by this invention are: The formed article is transparent, permitting the detection of flaws in the article prior to the additional expensive steps of annealing and conversion to a glass-ceramic material. The formed articles can be inspected while in the glassy state and defective articles can be rejected prior to such subsequent steps of annealing and heat treatment conversion to an opaque glass-ceramic, such early detection of defects resulting in cost savings.

MOLD APPARATUS

Figure 1:
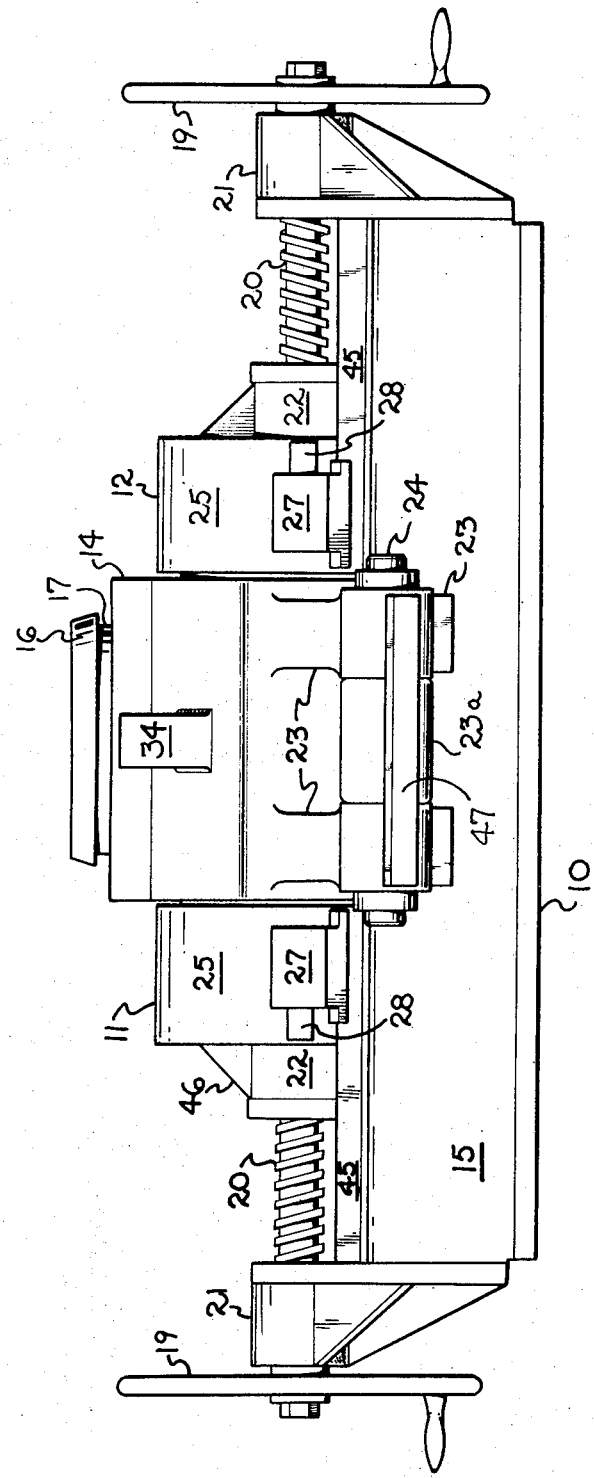
FIG. 1 is a side elevational view of the mold apparatus of this invention.
Figure 6:
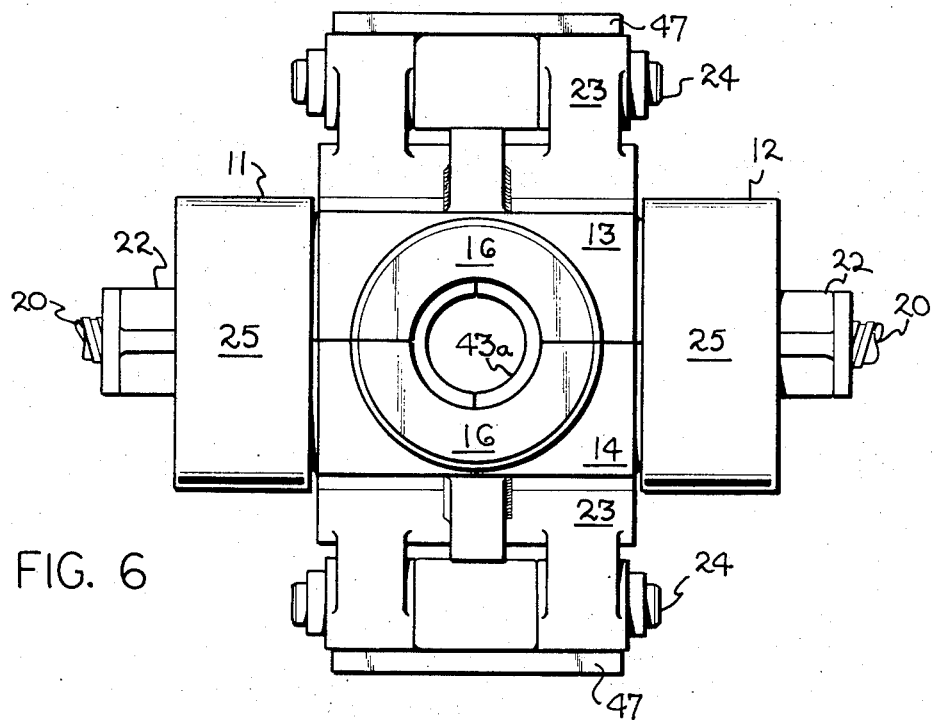
FIG. 6 is a top plan view of the forming mold of FIG. 1.

Referring to the drawings, FIG. 1 is a side view of the apparatus 10. Four mold members, 11, 12, 13 and 14 (FIG. 6), are positioned on massive metal bed 15. Side members 13 and 14 are positioned on pivot shafts 24 disposed parallel to the bed 15 and are hingedly attached to the bed in pivoted relation to open and close members 13 and 14 transversely on bed 15. End members 11 and 12 are movable longitudinally along bed 15 by opposedly operated hand cranks 19. Hand cranks 19 each comprise a threaded shaft 20, journal mounted for rotation in a bracket 21 on the bed frame 15. Mold members 11 and 12 are each rigidly connected to an internally threaded collar 22. Each threaded shaft 20 is rotated by a crank and the threaded connection to its collar 22 imparts movement to the end member (11 or 12) longitudinally along bed 15. Each of the mold members 11 and 12 have hardened slides 66 that ride on parallel and inwardly inclined ways 45 on bed 15.

Figure 13:
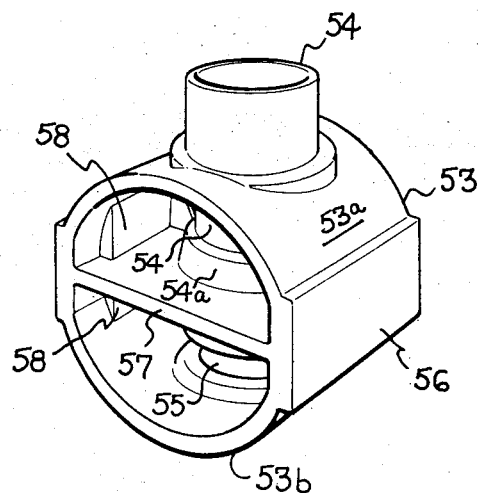
FIG. 13 is a perspective view of the gas turbine inner liner glass article formed in the apparatus of the foregoing figures.

The end mold members 11 and 12 cooperate to provide one of the important and novel features of the invention, namely, the provision of mold core elements 26 indicated specifically on FIGS. 3–5, 7, and 9–11 as 26a and 26b, which oppose each other and define the interior web-like sections of the article shown on FIG. 13. As seen on FIG. 13, the interior horizontal wall 57 of piece 53 is formed between the upper core 26a and 26b at the space 29 indicated on FIG. 5. The buttresses 58 of piece 53 are formed by flat faced cut-outs shown at 26c on the upper core elements 26a. Cylindrical barrel 54 and the base 54a are formed by the interior semi-circular facings of the upper core element 26a. The lower continuation 55 of barrel 54 is similarly formed by the interior semi-circular facings of the lower core element 26b. Thus, through core elements on the end mold members, the interior structure of the molded piece 53, such as 54, 54a, 55, 57 and 58, is shaped. The interior of the barrel 54 is shaped by a press plunger 49, to be presently described.

Side members 13 and 14 are hinged on bed 15 to pivot about pin 24. On FIGS. 10 and 11, the side members are shown in their open and closed positions, respectively, about the already closed end mold members 11 and 12 just described. (See FIG. 5 whereat closing and opening movement of the side members is demonstrated as between the positions of 13 (closed) and 14 (open).)

Figure 2:
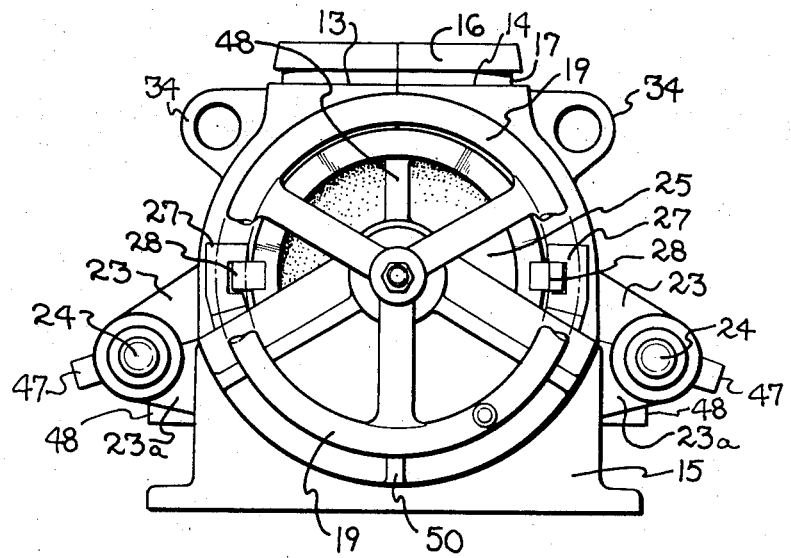
FIG. 2 is an end elevational view of the apparatus taken from the left-hand side of FIG. 1.
Figure 3:
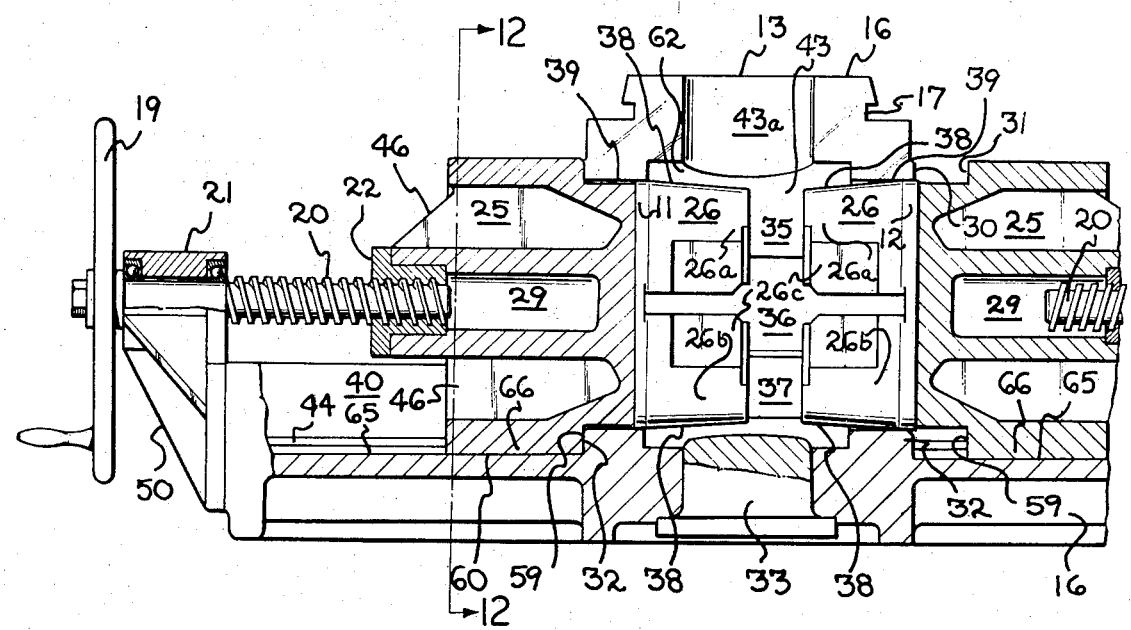
FIG. 3 is a partial sectional elevational view taken along line 3—3 on FIG. 2.
Figure 5:
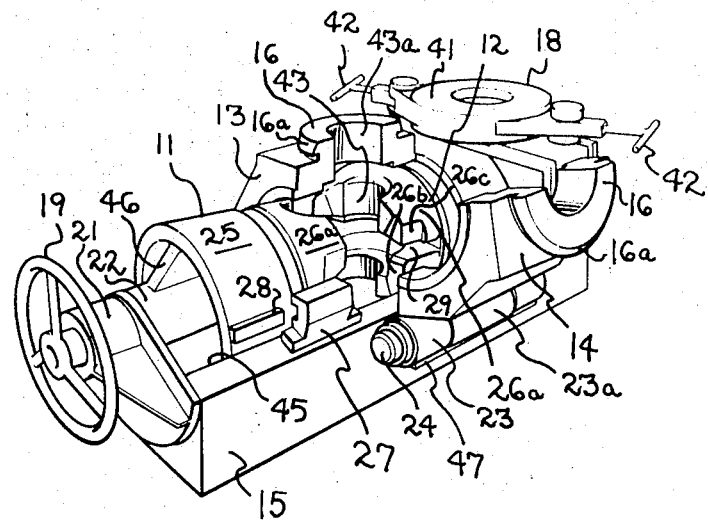
FIG. 5 is a perspective view of the apparatus of FIG. 1.
Figure 7:
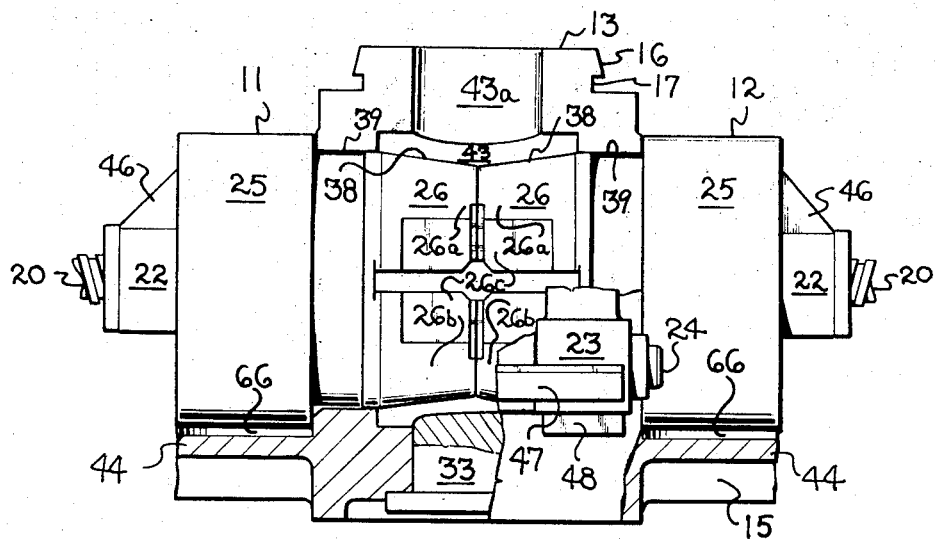
FIG. 7 is a side elevational view, partly in section, of the apparatus of FIG. 6.
Figure 8:
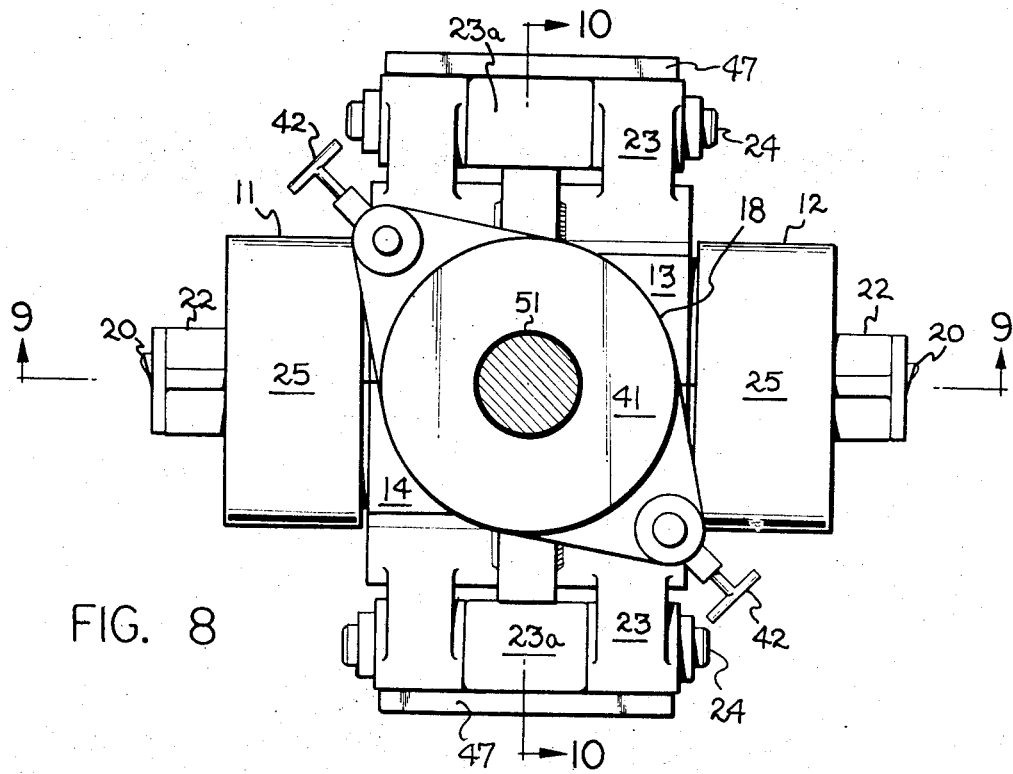
FIG. 8 is a view of the apparatus, like FIG. 6, showing the closure device.

As shown on FIG. 2 positioning blocks 27 are an integral part of the bed. A key 28 fits into the block 27 and rigidly positions the end members against any turning movement (FIG. 5). The two pairs of end members 11, 12 and side members 13, 14 cooperate in their closed, molding position to form a mold cavity 43. The side members each include a semi-annular, mouth defining, upper ring 16, which are complementary and together in "closed" relationship define the mold loading passageway 43a (FIG. 3). As seen on FIG. 5, the mold apparatus is closed in the following manner. End members 11 and 12 are moved toward each other to a juxtaposed position along longitudinal ways 44. Next, the side mold members 13 and 14 are each pivoted toward each other to the closed position about end members 11 and 12 whereat the side members overlap portions of the end members 11 and 12 in a closed position (FIG. 7). Bed 15 has stops 32, and the mold mounts 25 have flanges 59, which abut the stops when the end mold members are in their forming position. The combined action of the key 28 and the positioning block 27, in conjunction with the abutting relationship between the bed and the end mold members 11 and 12 provide a very rigid positioning of the mold members during the molding process, which aids to insure dimensional accuracy of the finished article.

The mold sections are locked and held in molding position by the combination of the opposed end cranks 19, which place end members 11 and 12 into position, the closing of side members 13 and 14, which wrap around or envelope a portion of the structure of 11 and 12, and the mold closure device 18 (see FIGS. 1, 5, 8 and 9). After the side members 13 and 14 are closed so that their upper neck sections 16 abut one another, the device 18 encircles the top part of the sections and is closed tightly to clamp about flange 16a. The mold clamp 18 is closed at the handles 42. Mold closure device 18 comprises a circular cap 41 which slides over the taper of flange 16a and is locked by a pin inserted through cap 41 to lock it in place about the neck section 16. The plural handles 42 connected on cap 41 are used for moving device 18 into and out of locking position on the flange 16a of the neck section.

As may be seen on FIG. 3, the end mold members 11 and 12 are each made of a massive piece of metal, comprising a mount 25 and forming elements 26 which, in their complementary shape, define the cored portion and part of the exterior configuration of the turbine inner liner piece that is to be formed. The forming elements 26 comprise cores 26a and 26b and the outer annular surface 38 of elements 26 are inwardly tapered for purposes of mating in part with the round surfaces of side mold members 13 and 14 along their inner surfaces and for withdrawal or removal of the elements 26 from a molded glass piece (see FIG. 3). Mount 25 has web plates 46 strengthening the mold member mount. Bottom surface 60 of mount 25 rests on the bottom track 44 of bed 15. As is clearly shown on FIGS. 3 and 12, the bed is U-shaped with bottom track 44 having arcuate ways on sides 40. The lower surface of mount 25 has a complementary arcuate shape to nest on the ways' surface of track 44. This relationship provides a true longitudinal movement of the end mold members attached to mounts 25 as they are oppositely moved by cranks 19 along bed 15. Mount 25 has a longitudinal tongue 66, which rides in groove 65 along the track 44. This tongue and groove fit maintains the radial alignment of the members 11 and 12 on the track 44.

Figure 4:
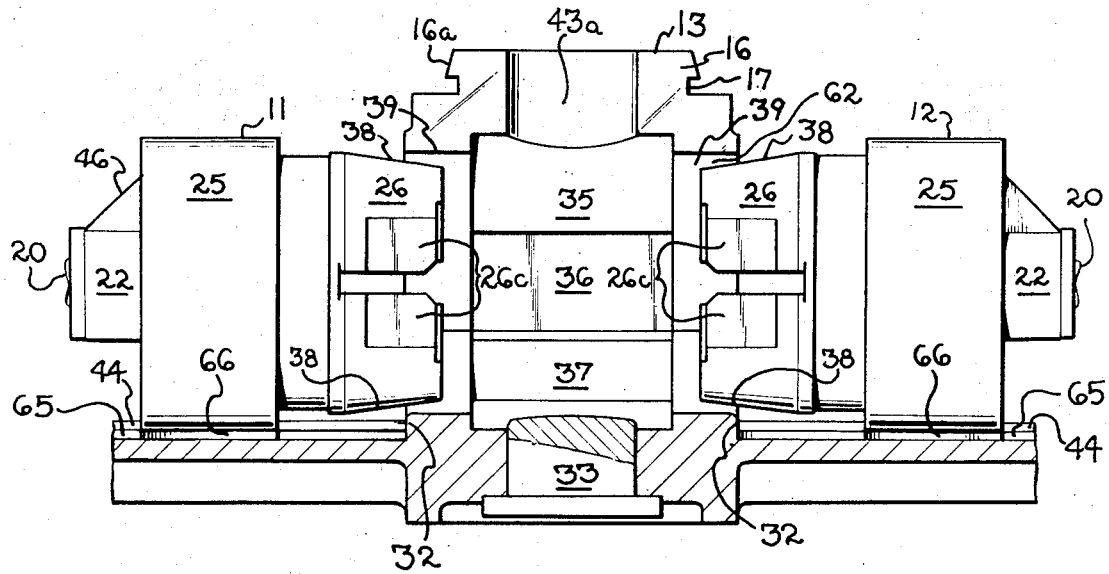
FIG. 4 is a side elevational view of the forming section of the apparatus of FIG. 1, partly in section.

Referring to FIGS. 3 and 4, each complementary mold member 13 and 14 includes a molding surface forming a portion of the exterior of the piece 53 molded therein. The top, middle and bottom side forming surfaces 35, 36 and 37, respectively, form the upper arcuate surface 53a, flat side surface 56 and lower arcuate surface 53b of the piece 53 (FIG. 13).

The annular surfaces 39 seat on the tapered surface 38 of forming elements 26 of end mold members 13 and 14. The left-hand portion of FIG. 3 illustrates the end mold member 11 and side mold member 13 in the "closed" forming position. In the right-hand portion of FIG. 3, mold member 12 is shown in a partially open position. When this mold section is closed, the annular abutment 31 will seat against the surface 30 of the upper neck section 16 of the side members and the interior vertical faces of cores 26 will engage. There is molding space at 62 between the tapered surface 38 and the inner surfaces of the side faces in the molding position. Inner edge 39 of the side mold members engages the circumference of the forming section 26 of the end members in forming position.

Figure 11:
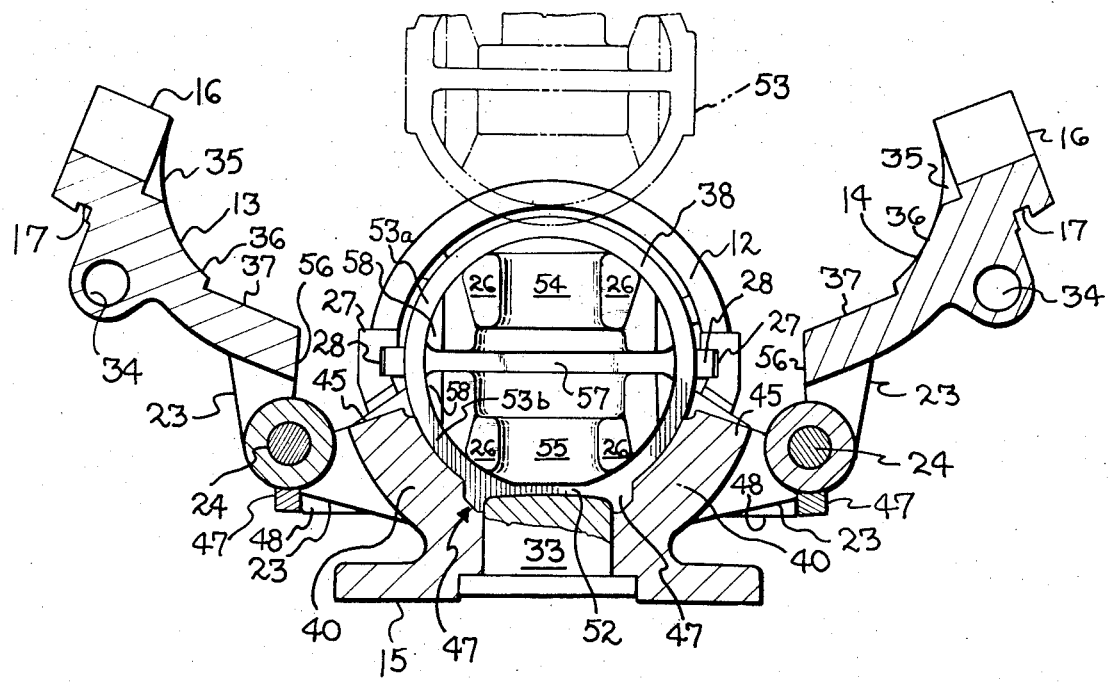
FIG. 11 is a sectional elevational view like FIG. 10 showing the side mold members in a pivoted, open position.
Figure 10:
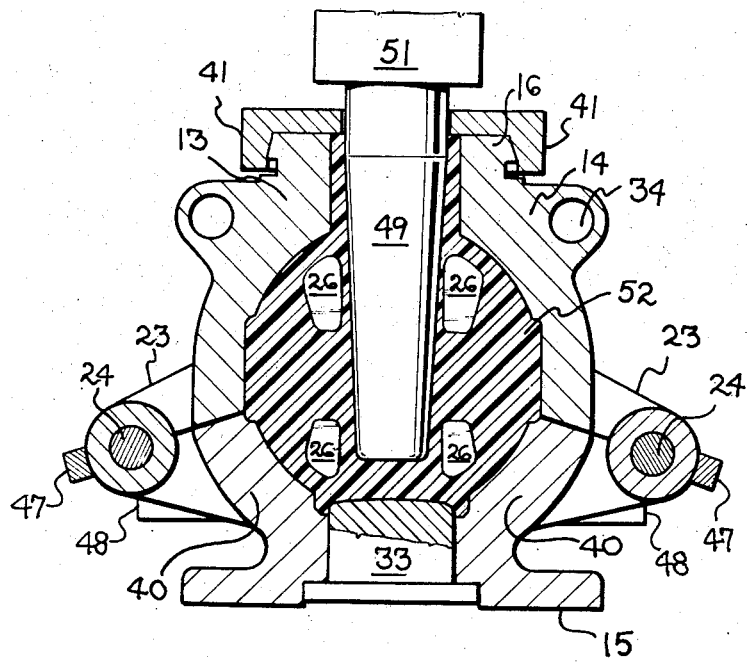
FIG. 10 is a transverse sectional elevational view taken along line 10—10 of FIG. 8.

For a more convenient illustration, FIGS. 10 and 11 respectively show the side mold members in their closed position and in their open position. The members 13 and 14 pivot between these positions about their hinge pins 24 and hinges 23.

Side mold members 13 and 14 swing outwardly from the end center line of the bed, the inner wall of the mold sections parting along surfaces 45 and 56 on each. The hinge lugs 47 abut against the stops 48 to position movable sections of 13 and 14 in an "open" position (FIG. 11).

The four mold members are designed to form a cavity 43 to contain molten glass, and to have the glass flow into the cavity in a turbulent-free flow. The cavity 43 contains forming cores 26 to shape the glass to an article 53 shown on FIG. 13 (shown in phantom on FIG. 11). The glass composition in molten state, as hereinafter disclosed, is poured into the mold through the opening 43a in the neck sections 16. After introducing the molten glass charge, pressing plunger 49 is inserted into the mold cavity. Pressing plunger 49 is inwardly tapered and exerts a pressure on the entrapped molten glass as the plunger is driven into the mold cavity 43 and forces the glass throughout the closed mold cavity. A drive apparatus 51 of any conventional type may be used to reciprocally operate the plunger, and is therefore shown only in a representative manner herein. The formed turbine liner 53 has the configuration of the mold cavity 43 and the complicated article 53 is formed in one piece by pouring molten glass into the mold and applying variable pressures to the glass. The forming process of this invention will be presently described.

Figure 9:
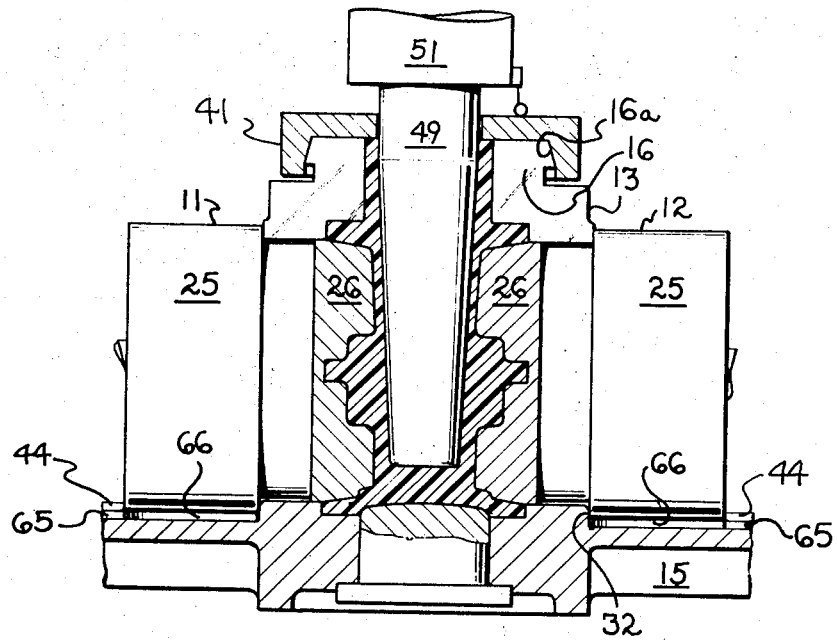
FIG. 9 is a partial, longitudinal sectional view taken along line 9—9 of FIG. 8.

The molding sequence of the apparatus is shown on FIGS. 7 and 9–11. With the mold closed, as shown on FIG. 7, molten glass is loaded into the cavity. Next the pressing plunger 49 is inserted into the molten glass charge to press the molten glass and fill the convolutions of the mold (FIGS. 9–10). After the glass is initially pressed to shape by the plunger, the latter is withdrawn and the mold members 11–12 are each relaxed from the molding position to compensate for differential expansions/contractions of the metal and glass materials undergoing heat exchange as the glass cools. As is explained hereinafter this relaxing of the pressing or forming pressure avoids cracking of the molded part as the glass cools and heat exchange takes place. After sufficient cooling of the glass part 53, the mold members are opened, as shown on FIG. 12, and the formed turbine inner liner 53 (shown in phantom outline) is removed from the mold. The formed turbine inner liner piece 53 has an outer curved shell comprised of upper arcuate wall 53a, lower arcuate wall 53b joined by the flattened vertical side wall 56. A horizontal separating wall 57 extends between the opposed vertical walls 56. A plurality of buttresses 58 are formed between the separating wall 57 and the inner surface of wall 56 of the piece 53. The cylindrical barrel 54 extends vertically through upper wall 53a and wall 57. The barrel 55 integral with upper barrel 54 extends toward the bottom cylindrical section 52 formed by the mold bottom plug 33, in lower wall 53b (FIG. 11). This lower portion 55 of the barrel has a passage drilled through the wall 52 in the finishing operation. The plug 33 forms a removable bottom member for the mold.

Figure 12:
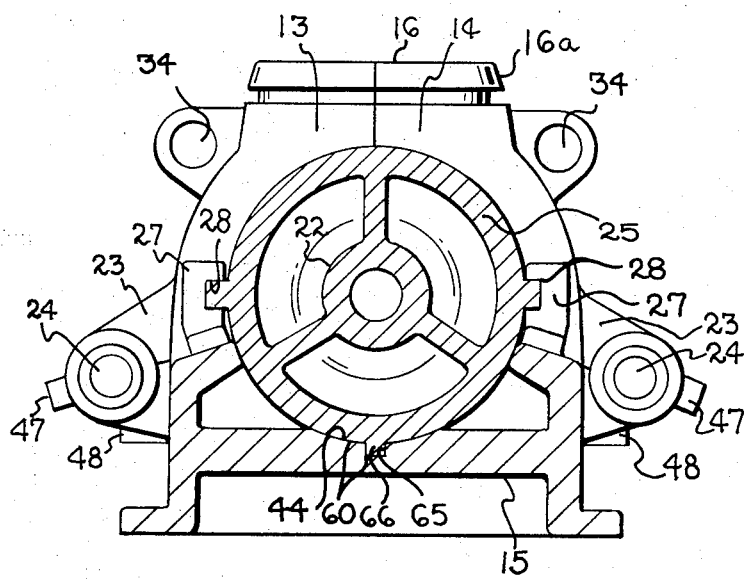
FIG. 12 is an elevational view of the forming apparatus, partly in section, illustrating the guideways for the longitudinal movemen of the end mold members along the bed.
Figure 14:
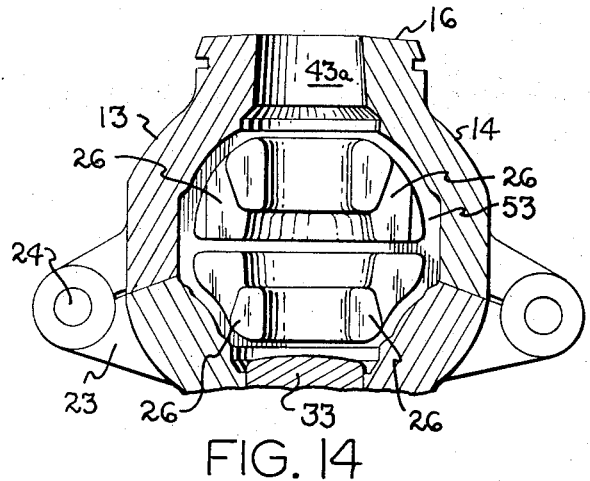
Figure 15:
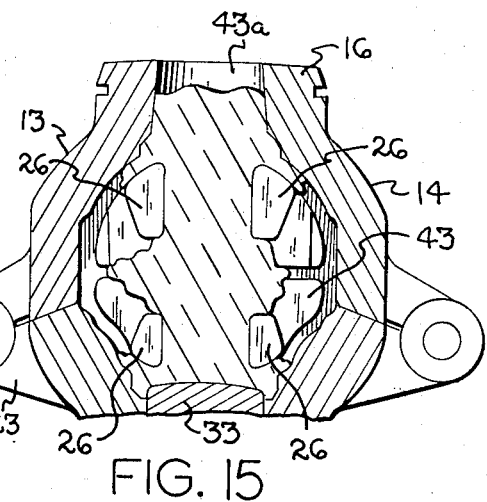
Figure 16:
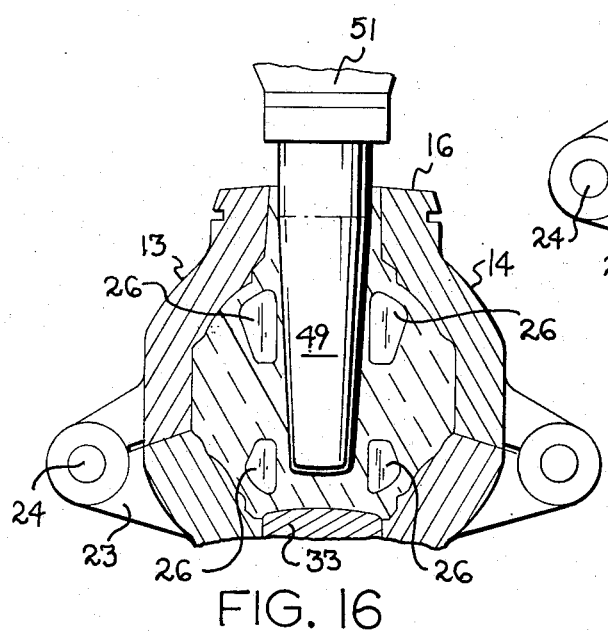
Figure 17:
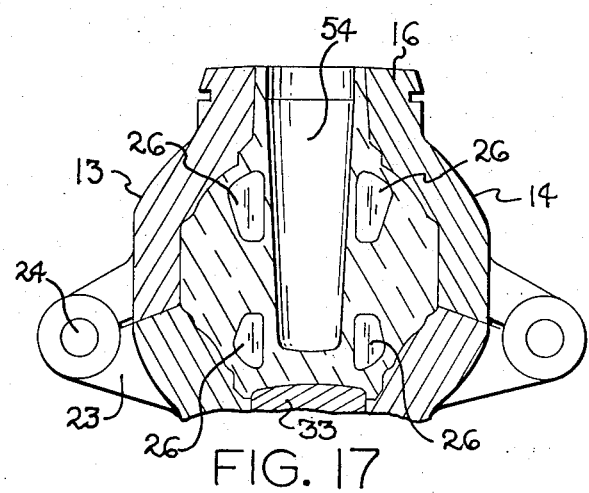

FIG. 12 shows the bed 15 in cross-section with the side walls 40 and the track 44, and having groove 65 in the bottom of the bed. A tongue 66 extends from the mount and is engaged in the groove. This arrangement of tongue 66 and groove 65 stabilizes the movement of the mount 25 along the bed track 44 and, in conjunction with the action of block 27 and key 28 on the side of the mount, serves to rigidly position the opposed mold member mounts on the bed.

PROCESS

FIGS. 14–21 are schematic drawings illustrating the process of forming a one-piece glass-ceramic article such as a gas turbine inner liner 53. In carrying out the process, the mold members 11–14 are closed to the positions shown on FIG. 14. Prior to closing, the mold cavity 43 may be coated with a release coating which can be a graphite compound, a refractory oxide coating, or the like. Molten glass at a temperature higher than about log viscosity 3 is poured into the mold through the top opening 43a of the cavity 43 until the molten glass fills most of the cavity volume, as shown on FIG. 15. At log viscosity 3 or less, the glass is very fluid. A plunger 49 is inserted into the mold cavity through top opening 43a and glass pressing pressure, generated by the driving mechanism 51, causes plunger 49 to press the viscous glass throughout the mold cavity 43. This is shown on FIG. 16. The pressing pressure dwells momentarily as plunger 49 arrives at its innermost penetration. The taper of the plunger 49 is conventional to permit withdrawal. As plunger 49 is pressed into the molten formable glass in the mold cavity, it forces the glass around the core elements 26 and the resultant piece 53 is shaped. With the glass mass distributed for cooling (FIG. 17), it is necessary to eliminate cracking of the piece which often occurs at its thicker sections. Thereafter, plunger 49 is quickly partially withdrawn and the glass undergoes some cooling in the condition shown on FIG. 17. Although it is not illustrated precisely on the drawings, in the condition shown on FIG. 17 the end mold members 11 and 12 are also relaxed, i.e. slightly retracted. According to the time schedule disclosed hereinafter in Table I, simultaneously, the mold cavity is expanded by backing off the end mold members 11 and 12; these mold members being moved about ⅛ inch; then, subsequently, after a few seconds, a second increment of ⅛ inch, etc. The step of backing off the mold members from contact with the formed glass inner liner 53 requires precise compensation for both the contracting molten glass and the expanding hot metal mold members. The quick removal of the plunger 49 and separation of the end mold members prevent the expanding metal mold from cracking the cooling liner, due to the different expansion rates of the glass and metal materials. This occurs when the glass in the mold has cooled sufficiently to be self supporting. Thereafter, side mold members 13 and 14 are swung open, and end mold members 11 and 12 are completely withdrawn. The molded article is next transferred to a lehr and cooled further, according to the schedule, to prevent cracking. In the annealing lehr, the liner is subjected to a controlled annealing schedule, wherein the temperature of the glass is gradually reduced, to reduce internal stresses which develop therein during cooling. If unrelieved, these stresses can cause the liner to crack during cooling. The cooling schedule is described hereinafter.

MECHANICAL FINISHING

After annealing, certain portions of the inner liner are partially trimmed. At this point, the liner may be inspected for flaws as it is still in the glass state. Subsequently, the liner 53 will be heat treated in the manner described hereinafter to convert the glass to a crystallized, glass-ceramic material. The liner article may be ground and polished to a desirable finish.

Figure 18:
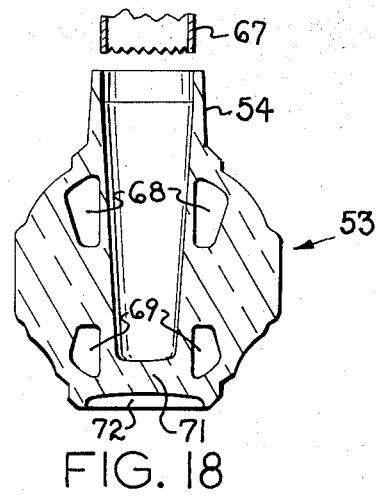
Figure 19:
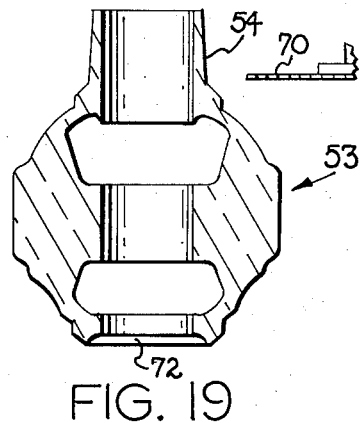
Figure 20:
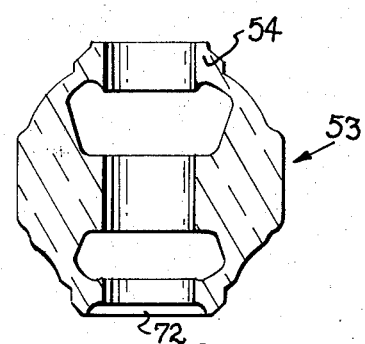
Figure 21:
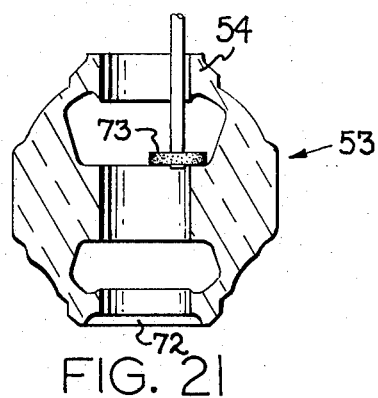

As is shown on FIGS. 18–20, annealed and inspected inner liner 53 is mechanically finished to rough shape. One operation shown on FIG. 18 involves drilling the central barrel 54 of the piece so that it is cylindrical and extends vertically through liner 53. This is done by suitable core drill 67. This also removes the webbing excess at 68 and 69 in the part to finish the inside of the barrel 54 to the point shown on FIG. 19. The drilling also opens the passage of barrel 54 through the wall 71 at the push-up area 72 formed by the mold bottom plug 33.

Next, the upper end excess of barrel 54 is removed by saw 70. The liner 53 after being trimmed thusly is shown on FIG. 20. The steps of FIGS. 18 and 19 may be interchanged. When this operation is finished, the liner 53 is ready to be transferred to a kiln wherein the glass is converted by heat treatment cycle to a crystallized, glass-ceramic part. After heat treatment is completed, the cavities in liner 53 may be ground and polished by a tool such as an internal rotary grinder 73, shown on FIG. 21.

GLASS COMPOSITION

An example of a heat-crystallizable glass composition used for forming a turbine liner as above described is the following, having this composition in parts by weight:

EXAMPLE I

| Ingredient: | Weight percent |
| --- | --- |
| $SiO_2$ | 74.8 |
| $Al_2O_3$ | 7.15 |
| $Li_2O$ | 4.50 |
| $TiO_2$ | 1.45 |
| $ZrO_2$ | 1.60 |
| $Sb_2O_3$ | 0.30 |
| $Na_2O$ | 0.10 |
| Molar ratio $SiO_2$-$Al_2O_3$ | 7.40 |
| Molar ratio $Li_2O$-$Al_2O_3$ | 0.90 |

The ingredients are mixed in a batch and are then heated in a glass furnace and brought into the molten state and to a temperature of approximately 2,900° F.; the molten thermally-crystallizable glass material is then transferred to the mold apparatus, above described, and the liner is formed.

FORMING PROCESS SCHEDULE

The following is a description of the forming process, summarized in Table I.

Starting at time 0, molten glass is poured into the mold from the furnace. The initial portion of the glass is discarded to remove imprints which may gather at the exit of the furnace. The molten glass begins to flow into the mold at 0.28 minute. At 0.41 minute, the mold is filled. Cooling water is supplied to the outside of the mold at 0.28 to reduce the temperature of the mold parts which prevents crazing of the mold surfaces. The pressing plunger is completely inserted into the mold at 0.83 and removed at 1.43. Concurrent with the insertion of the pressing plunger at 0.83, the end mold members are backed off by about 1/16 to ⅛ of an inch. After an interval of about one or two seconds, the mold members are further moved about by about an additional ⅛ inch and the plunger is raised about 1 inch. The separation of the mold members prevents the expanding metal mold from cracking the contracting cooling glass liner due to the different coefficients of thermal expansion rates of the glass and metal materials. The backing off step should precisely compensate for the difference in coefficients of thermal expansion of the glass and the mold to prevent cracking the formed article. Table I, trials 2 and 3, show additional forming cycles:

TABLE I

|  | Trial | | |
| --- | --- | --- | --- |
|  | 1 | 2 | 3 |
|  | Minutes | | |
| Glass supply open | 0.0 | 0.0 | 0.0 |
| Glass poured in mold | 0.28 | 0.17 | 0.25 |
| Mold filled | 0.41 | 0.33 | 0.45 |
| Water on | 0.28 | 0.17 | 0.25 |
| Plunger inserted | 0.83 | 0.75 | 0.85 |
| Plunger removed | 1.43 | 1.32 | 1.45 |
| Backoff end molds | 0.83 | 0.75 | 0.85 |
| Open end molds | 2.20 | 2.15 | 2.13 |
| Open side molds | 2.10 | 2.08 | 2.11 |
| Out of mold | 2.40 | 2.64 | 2.54 |

Cooling water may be sprayed on the mold, or, with proper equipment, the cooling water can be circulated about the back (exterior) of the mold members. Surface temperature of the mold is maintained at less than 1,000° F.

COOLING SCHEDULE

The formed glass liner article is cooled according to the following schedule: The article is at about 1,250° F. and is held for about 6 hours. It is then cooled at a rate of 5° F. per hour to about 1,100° F., and then at about 25° F. per hour to room ambient temperature. This cooling schedule provided a satisfactory article which was free of cracks and defects. At this point in the process, the article is clear and transparent, and is inspected for defects. This process provides a transparent article prior to the conversion to a glass-ceramic. If the article is defective, it can be rejected without further expensive processing, including machining to dimensional tolerances. The cooled article is converted to a glass-ceramic according to a heat treatment schedule.

HEAT TREATMENT SCHEDULE

In one form, heat treatment was performed in a two-step series:

Step 1.—The article is heated at approximately 100° F. per hour to about 1,300° F. and held for approximately 8 hours; then at approximately 10° F. per hour to about 1,420° F. and held approximately 100 hours; then at approximately 5° F. per hour to about 1,450° F.; then at approximately 10° F. per hour to about 1,600° F. and held for approximately 10 hours; and then cool at the rate of approximately 300° F. per hour to room temperature.

Then, following step 1, the article is subsequently processed as follows:

Step 2.—The article is heated at approximately 100° F. per hour to about 1,300° F. and held for approximately 8 hours; then approximately 10° F. per hour to about 1,420° F. and held for approximately 100 hours; then approximately 5° F. per hour to about 1,450° F.; approximately 10° F. per hour to about 1,600° F. and held for approximately 10 hours; then approximately 10° F. per hour to about 1,800° F.; then approximately 5° F. per hour to about 2,100° F. and held approximately 4 hours; then approximately 5° F. per hour to about 1,950° F., and approximately 25° F. per hour to about 1,500° F.; and then decreased at the rate of approximately 300° F. per hour to room temperature.

Alternatively, heat treatment may be performed by omitting step 1 and following the second step only.

Other heat cycles known in the art may be used for the cooling treatment and also to convert the glass-ceramic forming material to a glass-ceramic so as to modify the end properties of the material, or to increase the speed of the treatment.

The following is a descritpion of other compositions of glass-ceramic making material used in the method of forming an article such as a turbine liner, by the process of this invention. Turbine liners operate at temperatures of at least 1,500° F. and above and must be dimensionally stable, with very low coefficients of thermal expansion and maintain a modulus of rupture of about 10,000 p.s.i., which is retained when operating at temperatures of at least 1,500° F. over an extended period of time.

Changes of length of less than 250 parts per million (p.p.m.), when exposed to temperatures of at least 1,500° F. for a period of 2,000 hours, should be a property of any glass-ceramic component utilized in turbine liners and preferably, such change in length should be less than 100 p.p.m. with an ideal expansion being less than 50 p.p.m. at the above temperatures. Other examples of thermally crystallizable glasses, having certain narrow, critical composition limits, within the broad area of $Li_2O$-$Al_2O_3$-$SiO_2$ and $Li_2O$-$Al_2O_3$-$SiO_2$-$ZnO$ systems, when shaped into structures including a turbine liner and then thermally "in-situ crystallized" to an at least partially crystalline ceramic (referred to herein as glass-ceramic) impart to the liner excellent thermal stability at high temperatures of at least 1,500° F. while simultaneously imparting a high modulus of rupture. Furthermore, such structures have a coefficient of thermal expansion within the range of $\pm 3 \times 10^{-7}/°$ C. and some are within the range of $\pm 0.5 \times 10^{-7}/°$ C. (0–700° C.).

Thermally crystallizable glass compositions of the invention coming within the $SiO_2$-$Al_2O_3$-$Li_2O$ system consist essentially of the following ingredients present within the indicated ranges, expressed in weight percent, and also within the indicated molar ratios.

| Ingredient: | Weight percent |
| --- | --- |
| $SiO_2$ | 62.8–80 |
| $Al_2O_3$ | 12.7–26.7 |
| $Li_2O$ | 3.2–7.6 |
| Nucleating agent | 3–9 | wherein the nucleating agent is either $TiO_2$ or a mixture of $TiO_2$ with $ZrO_2$. Usually, in order to obtain the desired properties, the compositions will consist of 98–100 weight percent $SiO_2$+$Al_2O_3$+$Li_2O$+the specified nucleating agents. When the $SiO_2/Al_2O_3$ molar ratio is from 4 to less than 5, the $Li_2O/Al_2O_3$ molar ratio is from 0.75 to 0.97; when the $SiO_2/Al_2O_3$ molar ratio is from 5 to 7.5, the $Li_2O/Al_2O_3$ molar ratio is from 0.65 to 0.97; when the $SiO_2/Al_2O_3$ molar ratio is more than 7.5 and less than 9, then the $Li_2O/Al_2O_3$ molar ratio is from 0.8 to 0.97; and when the $SiO_2/Al_2O_3$ molar ratio is more than 9 and up to 10, the $Li_2O/Al_2O_3$ molar ratio is from 0.87 to 0.97.

When the nucleating agent is a mixture of $TiO_2$+$ZrO_2$, then the $ZrO_2$ should not exceed 3% and preferably should be less than 3% i.e. up to 2.8% by weight and preferably at least 0.5% by weight, and the total amount of $TiO_2$+$ZrO_2$ is at least 3 weight percent up to about 9 weight percent.

While more than about 9 weight percent $TiO_2$ or total nucleating agent may be used, there is no advantage in using such large amounts because the properties of the resulting glass-ceramics are not improved. Further, raising the $TiO_2$ levels has the result of raising the thermal expansion coefficient of the glass-ceramic. It is critical to have at least 3 weight percent nucleating agent in the composition. When less than 3 weight percent total nucleants are present, the nucleation rate is so slow that the heat treatment cycles are excessively long and the strength of the glass-ceramic which is formed is decreased. When $ZrO_2$ is present in an amount of 3 weight percent or more, it raises the liquidus of the glass melt and makes more difficult the processing of the glass into products.

Refining agents, such as antimony tri-oxide, arsenic oxide, or the like, may be present in the composition in an amount up to about 0.5 weight percent if such ingredients are deemed necessary for fining the glasses.

In one embodiment of the invention, the thermally crystallizable glass comes within the following composition ranges wherein the sole essential ingredients, expressed in weight percent, are as follows, and wherein the molar ratios are as indicated:

| Ingredient: | Weight percent |
|---|---|
| $SiO_2$ | 63–78.5 |
| $Al_2O_3$ | 13.8–23 |
| $Li_2O$ | 3.5–6.5 |
| Nucleating agent | 3–9 | wherein the $SiO_2/Al_2O_3$ molar ratio is from 5 to less than 9. The nucleating agent is as defined above and, when the $SiO_2/Al_2O_3$ molar ratio is from 7.5 to less than 9, the $Li_2O/Al_2O_3$ molar ratio is from 0.87 to less than 0.97; and when the $SiO_2/Al_2O_3$ molar ratio is from 5 to less than 7.5, the $Li_2O/Al_2O_3$ molar ratio is from 0.75 to 0.97.

Other compositions and thermal crystallization of glass-ceramic forming compounds are disclosed in U.S. patent application, Ser. No. 146,644, Planchock et al., filed May 25, 1971 (abandoned), and now in continuation-in-part application Ser. No. 229,959, filed Feb. 28, 1972 commonly assigned.

Representative compositions for forming turbine liners of the invention are set forth in Table II, wherein the ingredients are expressed in weight percents.

I claim:

1. A method of forming a turbine inner liner article in one piece, comprising the steps of:
   (a) raising the temperature of a batch of glass-ceramic forming material to its molten state at which the logarithm of the viscosity in poises is about 3; said glass batch material comprising in weight percent the following ingredients: $SiO_2$, 63–78.5%; $Al_2O_3$, 13.8–23%; $Li_2O$, 3.5–6.5%;
   (b) transferring a charge of said viscous molten glass to a closed multi-part mold; said mold having two movable end parts and two movable side parts;
   (c) forming the glass in said mold by inserting a pressing plunger into the molten glass to distribute the glass throughout the mold by pressing pressure;
   (d) maintaining said pressing pressure for about one-half minute or longer;
   (e) withdrawing the pressing plunger from said mold;
   (f) progressively increasing the internal volume of said mold by moving one or more of said mold parts outwardly from their said mold closed position while the formed article is cooling to hardened state;
   (g) removing the formed article from the mold; and
   (h) cooling the article to room temperature.

2. A method of forming a hollow turbine liner in one

TABLE II

| Composition number | 1 | 2 | 3 | 4 | 5 | 6 | 7 | 8 | 9 | 10 | 11 |
|---|---|---|---|---|---|---|---|---|---|---|---|
| Ingredients: | | | | | | | | | | | |
| $SiO_2$ | 78.30 | 78.90 | 75.85 | 76.45 | 74.80 | 73.00 | 70.85 | 70.85 | 70.75 | 70.80 | 70.85 |
| $Al_2O_3$ | 14.20 | 13.65 | 16.10 | 16.20 | 17.15 | 18.45 | 20.05 | 20.05 | 19.75 | 20.05 | 20.00 |
| $Li_2O$ | 3.95 | 4.00 | 4.50 | 3.80 | 4.50 | 5.00 | 5.55 | 5.40 | 5.55 | 5.55 | 5.45 |
| $TiO_2$ | 1.45 | 1.45 | 1.45 | 1.45 | 1.45 | 1.45 | 1.45 | 1.40 | 1.40 | 1.40 | 1.40 |
| $ZrO_2$ | 1.60 | 1.60 | 1.60 | 1.60 | 1.60 | 1.60 | 1.60 | 1.60 | 1.60 | 1.60 | 1.60 |
| $Sb_2O_3$ | 0.30 | 0.30 | 0.30 | 0.32 | 0.30 | 0.30 | 0.30 | 0.30 | 0.30 | 0.30 | 0.30 |
| $Na_2O$ | 0.10 | | 0.10 | 0.10 | 0.10 | 0.10 | 0.10 | 0.30 | 0.10 | 0.10 | 0.10 |
| $K_2O$ | | | | | | | | | | | 0.20 |
| $Fe_2O_3$ | | | | | | | | | 0.45 | 0.10 | |
| Molar ratio: | | | | | | | | | | | |
| $SiO_2/Al_2O_3$ | 10.00 | 9.80 | 8.00 | 8.00 | 7.40 | 6.70 | 6.00 | 6.00 | 6.00 | 6.00 | 6.00 |
| $Li_2O/Al_2O_3$ | 0.95 | 0.97 | 0.95 | 0.80 | 0.90 | 0.95 | 0.95 | 0.95 | 0.95 | 0.95 | 0.95 |
| Composition number | 12 | 13 | 14 | 15 | 16 | 17 | 18 | 19 | 20 | 21 | 22 |
| Ingredients: | | | | | | | | | | | |
| $SiO_2$ | 70.75 | 68.00 | 71.05 | 71.30 | 71.50 | 69.35 | 67.10 | 72.00 | 68.45 | 64.00 | 64.85 |
| $Al_2O_3$ | 20.00 | 22.25 | 20.10 | 20.15 | 20.20 | 19.60 | 18.95 | 20.25 | 23.25 | 25.35 | 25.60 |
| $Li_2O$ | 5.35 | 6.20 | 5.30 | 5.00 | 4.75 | 4.55 | 4.45 | 4.20 | 4.75 | 7.10 | 6.00 |
| $TiO_2$ | 1.40 | 1.45 | 1.45 | 1.45 | 1.45 | 6.00 | 9.00 | 1.45 | 1.45 | 1.45 | 1.45 |
| $ZrO_2$ | 1.60 | 1.60 | 1.60 | 1.60 | 1.60 | | | 1.60 | 1.60 | 1.60 | 1.60 |
| $Sb_2O_3$ | 0.30 | 0.30 | 0.30 | 0.30 | 0.30 | 0.30 | 0.30 | 0.30 | 0.30 | 0.30 | 0.30 |
| $Na_2O$ | 0.50 | 0.10 | 0.10 | 0.10 | 0.10 | 0.10 | 0.10 | 0.10 | 0.10 | 0.10 | 0.10 |
| $K_2O$ | | | | | | | | | | | |
| $Fe_2O_3$ | | | | | | | | | | | |
| Molar ratio: | | | | | | | | | | | |
| $SiO_2/Al_2O_3$ | 6.00 | 5.20 | 6.00 | 6.00 | 6.00 | 6.00 | 6.00 | 6.00 | 5.00 | 4.30 | 4.30 |
| $Li_2O/Al_2O_3$ | 0.95 | 0.95 | 0.90 | 0.85 | 0.80 | 0.80 | 0.80 | 0.70 | 0.70 | 0.95 | 0.80 |

This invention provides a method for forming a one-piece turbine inner linear from a glass convertible to a glass-ceramic. The compositions provide a turbine liner having very desirable characteristics of a high resistance to heat and a low coefficient of thermal expansion. The process has another important advantage; the liner can be inspected for flaws before continuing with the expensive conversion of a glass to a glass-ceramic material.

The invention provides for a glass article of substantial mass and complex shape to be molded in a contiguous and integral construction. The apparatus and method of this invention provide for forming this complex article of glass that is charged at molding at a log viscosity of 3 or less and provides the metal mold components including internal coring elements that are forming sections of the mold. Internal coring and passages in the article formed thereby are later finished to shape of the final configuration of the hardened glass article.

The finished article, having been annealed and inspected previously, is now processed to convert the transparent, glassy state of the material of the body to a glass-ceramic material of the properties being highly advantageous to use in a gas turbine or like utility.

piece, in a mold comprised of plural, opposed pairs of movable molding surfaces, comprising the steps of:
   (a) partially filling the mold while said surfaces are in a closed position with a molten glass-ceramic forming material at a log viscosity of approximately 3 or less;
   (b) pressing the molten glass within the mold, the pressing pressure causing the molten glass to assume the internal configuration of the internal molding surfaces at closed position to form an inner liner shape;
   (c) simultaneously backing off at least one pair of said molding surfaces from the inner liner while the glass is undergoing hardening to compensate for the differential in volumetric change of the hardening article and mold cavity due to expansion of the closed molding surfaces;
   (d) removing the pressing plunger from the mold and thereby reducing the pressure on the molten glass, while permitting the formed inner liner to harden; and
   (e) cooling the formed inner liner to room temperature to relieve internal stresses.

3. A method of forming a hollow turbine inner liner in one piece in a metal mold having plural, opposed pairs of movable molding members having surfaces which together, in a closed position, form a molding cavity, comprising the steps of:
  (a) mixing and melting a batch of glass-ceramic making materials to a substantially homogeneous molten condition wherein the glass has a log viscosity of about 3;
  (b) transferring a charge of said molten glass into the mold cavity;
  (c) inserting a pressing plunger into the mold cavity for a momentary dwelling time, thereby applying pressing pressure to the molten glass completely filling the mold cavity therewith;
  (d) removing the plunger from the mold;
  (e) backing off at least one pair of said molding members immediately following the pressing to precisely compensate for the contracting glass and expanding metal mold to thereby reduce mold pressure on said article and prevent cracking in the formed glass article; and
  (f) gradually cooling the article to ambient temperature so as to anneal the glass article and prevent cracking thereof.

4. A method of forming a hollow turbine inner liner having a complex configuration in a metal mold having plural opposed pairs of movable molding members defining on their juxtapositioned surfaces in closed position a molding cavity, comprising the steps of:
  (a) melting a batch of glass-ceramic forming material to relatively viscous molten state of a temperature at which the logarithm of the viscosity of the glass in poises is about 3 or less;
  (b) introducing a charge of said viscous molten glass into said mold and partially filling the molding cavity with the viscous molten glass;
  (c) inserting a pressing plunger into the molten glass and increasing the pressure on the glass due to the due pressure applied by the plunger, thereby distributing the glass throughout the molding cavity;
  (d) maintaining said pressing pressure for a brief time duration while the glass in said mold initially hardens to a self-supporting state;
  (e) slightly withdrawing at least one pair of the molding members from the formed article as the latter is undergoing cooling and hardening to simultaneously compensate for
    (1) the contracting volume of the hardening glass of the article, and
    (2) the expansion of the hot metal surfaces of the mold;
  (f) withdrawing the pressing plunger; and
  (g) cooling the formed inner liner article to ambient temperature so as to relieve internal stresses.

5. The method of claim 4 wherein, the step of cooling the article to ambient temperature comprises holding the temperature of the article at about 1,250° F. for approximately 6 hours, cooling the article at the rate of about 5° F. per hour to about 1,100° F., then further cooling at about 25° F. per hour to ambient temperature to provide a formed article free of cracks.

6. The method of claim 4, wherein the pressing plunger is inserted into the mold for a time duration of about one-half minute.

7. The method of claim 4, wherein said molding members are withdrawn in a direction away from the closed position a distance of about ⅛ inch.

8. The method of claim 4, wherein said molding members are externally cooled during the addition of the molten glass into the mold to prevent the mold faces from crazing.

9. A method of forming a turbine inner liner having a complex configuration, in a mold having juxtaposed, plural molding members, comprising the steps of:
  (a) transferring a charge of glass-ceramic forming material in a molten state having a temperature at which the logarithm of the viscosity of the glass in poises is about 3 or less to said mold and partially filling the mold therewith;
  (b) inserting a pressing plunger into the molten material in the mold at about 0.55 minute from the beginning of the transfer step, thereby increasing the pressure on the glass in the mold due to the pressure of the plunger for distributing the glass throughout the mold to form an article;
  (c) maintaining said pressing pressure for a time duration of about one-half minute;
  (d) simultaneously withdrawing slightly a pair of the said molding members away from the formed article undergoing cooling and hardening, whereby said withdrawal of the molding members compensates for the contracting volume of the hardening glass material and the expansion of the hot metal of the molding members;
  (e) withdrawing the plunger simultaneously with the withdrawing of the molding members; and
  (f) cooling the formed article to room temperature to relieve internal stresses.

10. The method of molding a hollow glass article of substantial mass and complex shape in a unitary piece, the article having an irregular surface configuration, comprising the steps of closing a mold comprised of plural opposed pairs of molding members, one of said pairs defining a core within the molding cavity formed by said members conforming to the shape of the article, loading the mold while in closed and rigidly clamped position with a charge of relatively fluid molten glass, applying a forming pressure to the glass, thereby moving it throughout the mold cavity and around the core therein, the forming pressure being of higher order while the glass is relatively fluid and in initial stages of cooling, progressively relieving the forming pressure to a substantially lesser amount as the glass continues cooling, said pressure being relieved in part by withdrawing at least the one pair of said mold members having said mold core, thereby allowing for the glass and mold to change dimension relative to each other and obviate detrimental fractures in the glass during said pressure relieved and cooling stage.

11. The method of claim 10 wherein said forming pressure is applied by inserting a pressing plunger into the molding cavity after the latter has been loaded with said glass charge.

12. The method of claim 11, wherein said relieving of the forming pressure includes withdrawing the pressing plunger from its pressing position in the mold.

13. The method of claim 10, including the steps of removing the formed article from the mold and cooling the glass thereof at controlled rates from above 1,250° F. to about ambient temperature so as to relieve internal stresses in the article and prevent cracks being formed therein.

14. The method of claim 13, wherein the cooling of the glass is controlled as follows:
  (a) hold the temperature at 1,250° F. for approximately 6 hours;
  (b) cool at the rate of approximately 5° F. per hour until approximately 1,100° F.; and
  (c) cool at the rate of approximately 25° F. per hour to ambient temperature.

15. The method of claim 13, including the steps of inspecting the cooled article for defects and machining the article.

16. The method of claim 15, including the further step of converting the glass of the article to a glass-ceramic material by heat treatment, whereby the article is raised in temperature to at least 2,100° F. and thereafter cooled at controlled rates to ambient temperature so as to crystallize said glass material thereof to form a glass-ceramic material.

17. The method defined by claim 16, wherein the increments of raising temperature of the glass comprise heating to approximately 1,300° F. which temperature is maintained for at least about 8 hours, heating to approximately 1,420° F. which temperature is maintained for approximately 100 hours, heating to approximately 1,770° F. which temperature is maintained for approximately 10 hours, heating to approximately 2,100° F. which temperature is maintained for approximately 4 hours, and thereafter cooling the article gradually and at progressively increasing rates to ambient temperature.

18. The product manufactured by the method defined in claim 16.

References Cited

UNITED STATES PATENTS

| | | | |
|---|---|---|---|
| 3,113,877 | 12/1963 | Janakirama-Rao | 65—33 X |
| 3,282,711 | 11/1966 | Lin | 65—33 X |
| 3,117,881 | 1/1964 | Henry et al. | 65—33 X |
| 3,201,266 | 8/1965 | MacDowell | 65—33 X |
| 3,279,931 | 10/1966 | Olcott | 65—33 X |
| 617,949 | 1/1899 | Blue | 65—360 X |
| 3,531,272 | 9/1970 | Menear | 65—33 |

FRANK W. MIGA, Primary Examiner

U.S. Cl. X.R.

65—33, 68, 85, 305, 360

UNITED STATES PATENT AND TRADEMARK OFFICE
CERTIFICATE OF CORRECTION

PATENT NO. : 3,809,599
DATED      : May 7, 1974
INVENTOR(S) : YU K. PEI

It is certified that error appears in the above—identified patent and that said Letters Patent are hereby corrected as shown below:

Col. 8 line 35, should read

| Ingredient | Weight Percent |
|---|---|
| $Al_2O_3$ | 17.15 |

Signed and Sealed this

Twenty-eighth Day of June 1977

[SEAL]

Attest:

RUTH C. MASON
*Attesting Officer*

C. MARSHALL DANN
*Commissioner of Patents and Trademarks*